United States Patent
Zhu et al.

(10) Patent No.: US 9,439,151 B2
(45) Date of Patent: Sep. 6, 2016

(54) METHOD FOR INTELLIGENTLY SWITCHING ON/OFF MOBILE TERMINAL ANTENNA AND CORRESPONDING MOBILE TERMINAL

(75) Inventors: Dalong Zhu, Shenzhen (CN); Yimu Hu, Shenzhen (CN); Aiguo Yuan, Shenzhen (CN); Jinlu Xu, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 41 days.

(21) Appl. No.: 14/400,240

(22) PCT Filed: Jul. 13, 2012

(86) PCT No.: PCT/CN2012/078632
§ 371 (c)(1),
(2), (4) Date: Nov. 10, 2014

(87) PCT Pub. No.: WO2013/166777
PCT Pub. Date: Nov. 14, 2013

(65) Prior Publication Data
US 2015/0133066 A1  May 14, 2015

(30) Foreign Application Priority Data

May 11, 2012 (CN) .......................... 2012 1 0148125

(51) Int. Cl.
*H04B 7/06* (2006.01)
*H01Q 5/378* (2015.01)
(Continued)

(52) U.S. Cl.
CPC ........... *H04W 52/028* (2013.01); *H01Q 1/243* (2013.01); *H01Q 5/378* (2015.01);
(Continued)

(58) Field of Classification Search
CPC .... H04B 1/44; H04B 1/0053; H04B 7/0602; H04B 7/0814; H01Q 9/0442; H01Q 19/005; H01Q 5/378; H01Q 5/335; H01Q 5/50
See application file for complete search history.

(56) References Cited

U.S. PATENT DOCUMENTS 6,980,782 B1  12/2005  Braun et al.
7,345,638 B1 *  3/2008  Tan ........................... H01Q 1/38
                                                343/700 MS
(Continued)

FOREIGN PATENT DOCUMENTS

CN    1384988 A    12/2002
CN    1747228 A    3/2006
(Continued)

OTHER PUBLICATIONS

Translation of the Abstract for KR 2006/0022445 published on Mar. 10, 2006.

*Primary Examiner* — Andrew Wendell
(74) *Attorney, Agent, or Firm* — Thomas Horstemeyer, LLP

(57) ABSTRACT

A method for intelligently switching on/off an antenna of a mobile terminal and a corresponding mobile terminal are provided. A method includes: detecting a current working frequency band and a surrounding environment of a terminal; and according to a preset correspondence among an antenna radiation unit, an environmental condition, and the current working frequency band, changing impedance characteristics of a parasitic unit radiator. Another method includes: detecting a current working frequency band of a terminal; and according to a preset correspondence between an antenna radiation unit and the current working frequency band, changing impedance characteristics of a parasitic unit radiator. Another method includes: detecting a current surrounding environment of a terminal; and according to a preset correspondence between an antenna radiation unit and an environmental condition, changing impedance characteristics of a parasitic unit radiator. The terminal includes: a detection unit, an antenna control unit, and an antenna radiation unit.

10 Claims, 6 Drawing Sheets

(51) Int. Cl.
  *H01Q 5/335* (2015.01)
  *H04W 52/02* (2009.01)
  *H01Q 1/24* (2006.01)
  *H01Q 9/42* (2006.01)
  *H01Q 9/04* (2006.01)
  *H01Q 19/00* (2006.01)
  *H04B 1/44* (2006.01)
  *H04W 88/06* (2009.01)

(52) U.S. Cl.
  CPC ............ *H01Q 9/0442* (2013.01); *H01Q 9/42* (2013.01); *H01Q 19/005* (2013.01); *H04B 1/44* (2013.01); *H04W 52/0229* (2013.01); *H04W 88/06* (2013.01)

(56) References Cited

U.S. PATENT DOCUMENTS

| | | | |
|---|---|---|---|
| 9,253,626 B2* | 2/2016 | Rowson | H04W 8/22 |
| 2006/0281423 A1 | 12/2006 | Caimi et al. | |
| 2007/0069956 A1* | 3/2007 | Ozkar | H01Q 5/00 |
| | | | 343/700 MS |
| 2008/0088510 A1* | 4/2008 | Murata | H01Q 3/24 |
| | | | 343/700 MS |
| 2008/0204275 A1* | 8/2008 | Wavering | H04Q 9/00 |
| | | | 340/870.16 |
| 2009/0224991 A1* | 9/2009 | Rowson | H01Q 1/243 |
| | | | 343/747 |
| 2010/0041348 A1 | 2/2010 | Wilcox et al. | |
| 2011/0080325 A1* | 4/2011 | Livneh | H01Q 3/26 |
| | | | 343/702 |
| 2011/0309980 A1 | 12/2011 | Ali et al. | |
| 2012/0262343 A1* | 10/2012 | Radojkovic | H01Q 9/42 |
| | | | 343/702 |
| 2012/0274538 A1* | 11/2012 | Tsou | H01Q 1/243 |
| | | | 343/876 |
| 2013/0135162 A1* | 5/2013 | Shamblin | H01Q 9/06 |
| | | | 343/745 |

FOREIGN PATENT DOCUMENTS

| | | |
|---|---|---|
| EP | 2456007 A1 | 5/2012 |
| WO | 0131734 A1 | 5/2001 |

* cited by examiner

METHOD FOR INTELLIGENTLY SWITCHING ON/OFF MOBILE TERMINAL ANTENNA AND CORRESPONDING MOBILE TERMINAL

CROSS-REFERENCE TO RELATED APPLICATIONS

This application is the 35 U.S.C. §371 national stage of PCT Application No. PCT/CN2012/078632, filed Jul. 13, 2012, which is herein incorporated by reference in its entirety and which also claims priority to, and the benefit of, Chinese Patent Application No. 201210148125.X, filed May 11, 2012, which is herein incorporated by reference in its entirety.

TECHNICAL FIELD

The present document relates to the field of communication technology, and in particular, to a method for intelligently switching on/off an antenna of a mobile terminal and a corresponding mobile terminal.

BACKGROUND OF THE RELATED ART

With the arrival of 3G era, mobile communications have fully entered the 3G era, and the development of mobile communications has also entered into a more user-friendly and intelligent era. Especially with the rapid development of sensor networks, people's requirements on mobile communications have been beyond simple voice call functions, and the multi-network integrated user-friendly and intelligent cell phone terminal is people's most basic requirements on the mobile terminal in the new era.

Meanwhile, with the popularity of multi-mode multi-standard smart mobile terminals, especially with the rapid development of LTE technology, future design requirements on an antenna of a multi-mode mobile terminal, including 2G, 3G and 4G technologies, are also increasing. An antenna needs to achieve multi-mode multi-frequency band ultra wide band wireless communication capabilities. Therefore, the design technical requirements on an antenna of a mobile terminal are also increasing.

Meanwhile, with the popularity of communication technology and data services, people's requirements on voice quality are increasing, especially when influence of a human body on antenna performance has become increasingly concerned in the process of using a mobile terminal. Because the antenna of the mobile terminal is very small, it is difficult to achieve ultra-wide band. Its resonant frequency is generally narrow, the design requirements can be met in a free space state, but when the mobile terminal is operated or is used by people to make a call, since the human body is electrically conductive, the intervention of the human body will cause an offset in the resonance frequency of the antenna, thereby reducing the radiation efficiency of the antenna, seriously degrading antenna performance, and thus affecting the call or data services. Although there are related technologies, but most of the related technologies make an improvement by using a method for adjusting matching between a main path of a RF signal and an antenna, thereby resulting in enhancement of requirements on output power of the RF power amplifier, and therefore additionally increasing power consumption of the system of the mobile terminal, which is not an optimal scheme at present.

SUMMARY OF THE INVENTION

The technical problem to be solved by the embodiments of the present invention is to provide a method for intelligently switching on/off an antenna of a mobile terminal and a corresponding mobile terminal, to improve antenna performance.

In order to solve the above technical problem, the embodiments of the present invention use the following technical schemes:

A mobile terminal for intelligently switching on/off an antenna comprising a detection unit, an antenna control unit, and an antenna radiation unit which comprises a main feed unit radiator and a parasitic unit radiator, wherein, the detection unit is configured to detect a current working frequency band of the mobile terminal and transmit a detection result to the antenna control unit;

the antenna control unit is configured to receive the detection result transmitted by the detection unit and change impedance characteristics of the parasitic unit radiator according to a preset correspondence between the antenna radiation unit and the current working frequency band; and the parasitic unit radiator is configured to change the impedance characteristics under the control of the antenna control unit.

Alternatively, the detection unit is further configured to detect a current surrounding environment of the mobile terminal and transmit a detection result to the antenna control unit; and the antenna control unit is further configured to change the impedance characteristics of the parasitic unit radiator according to a preset correspondence between the antenna radiation unit and the environment condition, or preset correspondence among the antenna radiation unit, the environmental condition, and the current working frequency band.

Alternatively, the detection unit is configured to detect the current surrounding environment of the mobile terminal according to one or more of the following ways:

detecting whether the mobile terminal works in a free space;

detecting whether there is a human body approaching the mobile terminal;

detecting whether the mobile terminal is indoors; and detecting whether the mobile terminal is outdoors.

Alternatively, the antenna control unit is configured to change the impedance characteristics of the parasitic unit radiator according to the following way: transmitting an instruction to the parasitic unit radiator in the antenna radiation unit to switch on one or more parasitic units in the parasitic unit radiator and/or switch off one or more parasitic units in the parasitic unit radiator; and the parasitic unit radiator is configured to change the impedance characteristics under the control of the antenna control unit according to the following way: switching on one or more parasitic units in the parasitic unit radiator and/or switching off one or more parasitic units in the parasitic unit radiator according to the instruction transmitted by the antenna control unit.

A mobile terminal for intelligently switching on/off an antenna comprising a detection unit, an antenna control unit, and an antenna radiation unit which comprises a main feed unit radiator and a parasitic unit radiator, wherein, the detection unit is configured to detect a current surrounding environment of the mobile terminal and transmit a detection result to the antenna control unit;

the antenna control unit is configured to receive the detection result transmitted by the detection unit and change impedance characteristics of the parasitic unit radiator according to a preset correspondence between the antenna radiation unit and the environment condition; and the parasitic unit radiator is configured to change the impedance characteristics under the control of the antenna control unit.

Alternatively, the detection unit is configured to detect the current surrounding environment of the mobile terminal according to one or more of the following ways:

detecting whether the mobile terminal works in a free space;

detecting whether there is a human body approaching the mobile terminal;

detecting whether the mobile terminal is indoors; and detecting whether the mobile terminal is outdoors.

Alternatively, the antenna control unit is configured to change the impedance characteristics of the parasitic unit radiator according to the following way: transmitting an instruction to the parasitic unit radiator in the antenna radiation unit to switch on one or more parasitic units in the parasitic unit radiator and/or switch off one or more parasitic units in the parasitic unit radiator; and the parasitic unit radiator is configured to change the impedance characteristics under the control of the antenna control unit according to the following way: switching on one or more parasitic units in the parasitic unit radiator and/or switching off one or more parasitic units in the parasitic unit radiator according to the instruction transmitted by the antenna control unit.

A method for intelligently switching on/off an antenna of a mobile terminal, an antenna radiation unit of the mobile terminal comprising a main feed unit radiator and a parasitic unit radiator, the method comprising:

detecting a current working frequency band of the mobile terminal; and changing impedance characteristics of the parasitic unit radiator according to a preset correspondence between the antenna radiation unit and the current working frequency band.

Alternatively, the step of changing impedance characteristics of the parasitic unit radiator comprises:

switching on one or more parasitic units in the parasitic unit radiator; and/or switching off one or more parasitic units in the parasitic unit radiator.

A method for intelligently switching on/off an antenna of a mobile terminal, an antenna radiation unit of the mobile terminal comprising a main feed unit radiator and a parasitic unit radiator, the method comprising:

detecting a current surrounding environment of the mobile terminal; and changing impedance characteristics of the parasitic unit radiator according to a preset correspondence between the antenna radiation unit and the environment condition.

Alternatively, the step of detecting a current surrounding environment of the mobile terminal comprises one or more of the following detection:

detecting whether the mobile terminal works in a free space;

detecting whether there is a human body approaching the mobile terminal;

detecting whether the mobile terminal is indoors; and detecting whether the mobile terminal is outdoors.

Alternatively, the step of changing impedance characteristics of the parasitic unit radiator comprises:

switching on one or more parasitic units in the parasitic unit radiator; and/or switching off one or more parasitic units in the parasitic unit radiator.

A method for intelligently switching on/off an antenna of a mobile terminal, an antenna radiation unit of the mobile terminal comprising a main feed unit radiator and a parasitic unit radiator, the method comprising:

detecting a current working frequency band and a current surrounding environment of the mobile terminal; and according to a preset correspondence among the antenna radiation unit, the environmental condition, and the current working frequency band, changing impedance characteristics of the parasitic unit radiator.

Alternatively, the step of detecting a current surrounding environment of the mobile terminal comprises one or more of the following detection:

detecting whether the mobile terminal works in a free space;

detecting whether there is a human body approaching the mobile terminal;

detecting whether the mobile terminal is indoors; and detecting whether the mobile terminal is outdoors.

Alternatively, the step of changing impedance characteristics of the parasitic unit radiator comprises:

switching on one or more parasitic units in the parasitic unit radiator; and/or switching off one or more parasitic units in the parasitic unit radiator.

With the method and terminal according to the embodiments of the present invention, the antenna control unit controls the antenna radiation unit according to the working frequency band and/or a state of environment approach state of the mobile terminal, to enable the antenna to work at an optimal state, thereby enhancing communication quality of an air interface of a wireless communications system. On one hand, the antenna performance in the current working frequency band of the mobile terminal can be optimized according to the current frequency band, to solve the design problem that there are higher requirements of the antenna of the multi-standard multimode mobile terminal on the frequency bandwidth. On the other hand, when the mobile terminal is influenced by a human body, the antenna performance when the human body approaches is improved without increasing a loss in a RF main path, thereby enhancing the antenna performance and ensuring voice quality and the application of data services.

PREFERRED EMBODIMENTS OF THE PRESENT INVENTION

In order to make the purpose, technical schemes and advantages of the present document more clear and apparent, the present document will be further described in detail hereinafter with respect to accompanying drawings and embodiments. It should be understood that the specific embodiments described herein are merely used to explain the present document instead of limiting the present document.

Embodiment One

Figure 1:
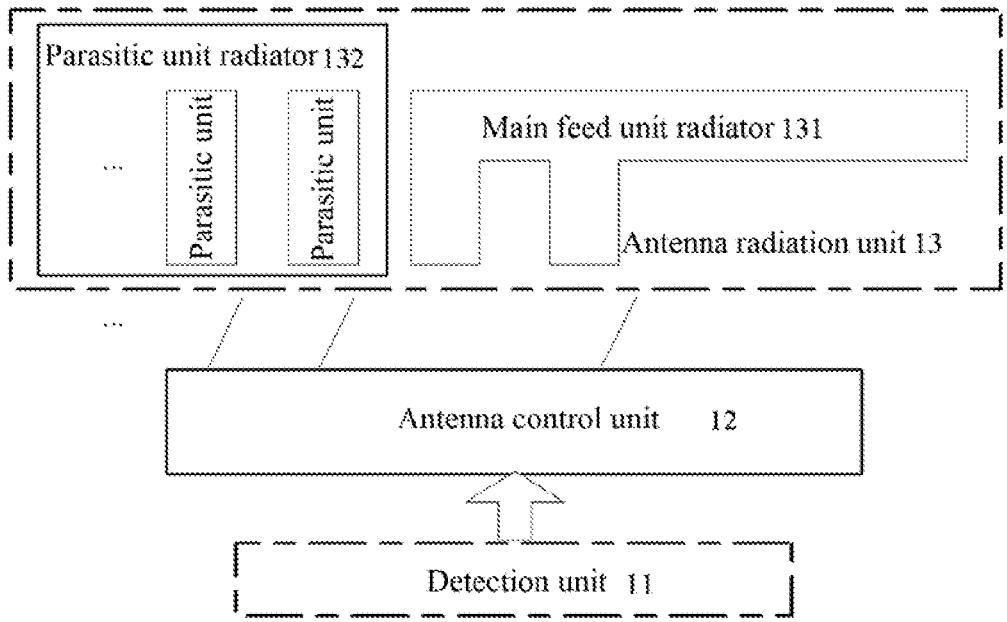
FIG. 1 is a diagram of a constitution for intelligently switching on/off an antenna according to embodiment one of the present invention.

The present embodiment describes a mobile terminal which can optimize antenna performance in a current working frequency band according to the current frequency band. As shown in FIG. 1, the mobile terminal includes a detection unit 11, an antenna control unit 12 and an antenna radiation unit 13, which includes a main feed unit radiator 131 and a parasitic unit radiator 132 including one or more parasitic units, wherein, the detection unit 11 is configured to detect a current working frequency band of the mobile terminal and transmit a detection result to the antenna control unit 12;

the antenna control unit 12 is configured to receive the detection result transmitted by the detection unit 11 and change impedance characteristics of the parasitic unit radiator 132 according to a preset correspondence between the antenna radiation unit 13 and the current working frequency band; and the parasitic unit radiator 132 is configured to change the impedance characteristics under the control of the antenna control unit 12.

Alternatively, the antenna control unit 12 is configured to change the impedance characteristics of the parasitic unit radiator 132 according to the following way:

the antenna control unit 12 transmitting an instruction to the parasitic unit radiator 132 in the antenna radiation unit 13 to switch on one or more parasitic units in the parasitic unit radiator 132 and/or switch off one or more parasitic units in the parasitic unit radiator 132; and the parasitic unit radiator 132 switching on one or more parasitic units in the parasitic unit radiator 132 and/or switching off one or more parasitic units in the parasitic unit radiator 132 according to the instruction transmitted by the antenna control unit 12.

The parasitic unit radiator 132 achieves a purpose of resonance by coupling with the main feed unit radiator 131, to extend the frequency bandwidth of the antenna.

By previously simulating and testing a correspondence between a working frequency band of the terminal and the antenna radiation unit, when the terminal is in operation, a most suitable constitution of the parasitic unit radiator 132 is selected according to the frequency band in which the terminal works. That is, switching on and/or off of various parasitic units in the parasitic unit radiator 132 is controlled through the antenna control unit 12, to change a form of the antenna radiation unit, thereby changing the working frequency band of the antenna, and thus improving antenna performance when the terminal is in different frequency bands. The above correspondence may be stored in the mobile terminal in a form of list.

In the process of using the mobile terminal, the performance adjustment and test of the antenna of the air interface are performed in a case of free space at present. However, in practical use, the mobile terminal is mostly hold by a user or is near a head of a person for wireless communication. Because the antenna of the mobile terminal is very small, it is difficult to achieve ultra-wide band. Its resonant frequency is generally narrow, the design requirements can be met in a free space state, but when the mobile terminal is operated or is used by people to make a call, since the human body is electrically conductive, the intervention of the human body will cause an offset in the resonance frequency of the antenna, thereby reducing the radiation efficiency of the antenna, seriously degrading antenna performance, and thus affecting the call or data services. The influence of the human body on the antenna which is known by people is primarily reflected in that due to intervention of the human body, for example, intervention of people's head or people's hand, it results in shifting the resonant frequency of the antenna to a low frequency point, thus directly influencing passive efficiency of the antenna and the frequency band in which the antenna works. Therefore, by adding a detection unit 11 for the surrounding environment (which primarily is human bodies), and controlling a corresponding parasitic unit according to a detection result, a pattern of the antenna can be automatically adjusted according to a surrounding human body approach condition, so as to improve antenna performance.

Figure 2:
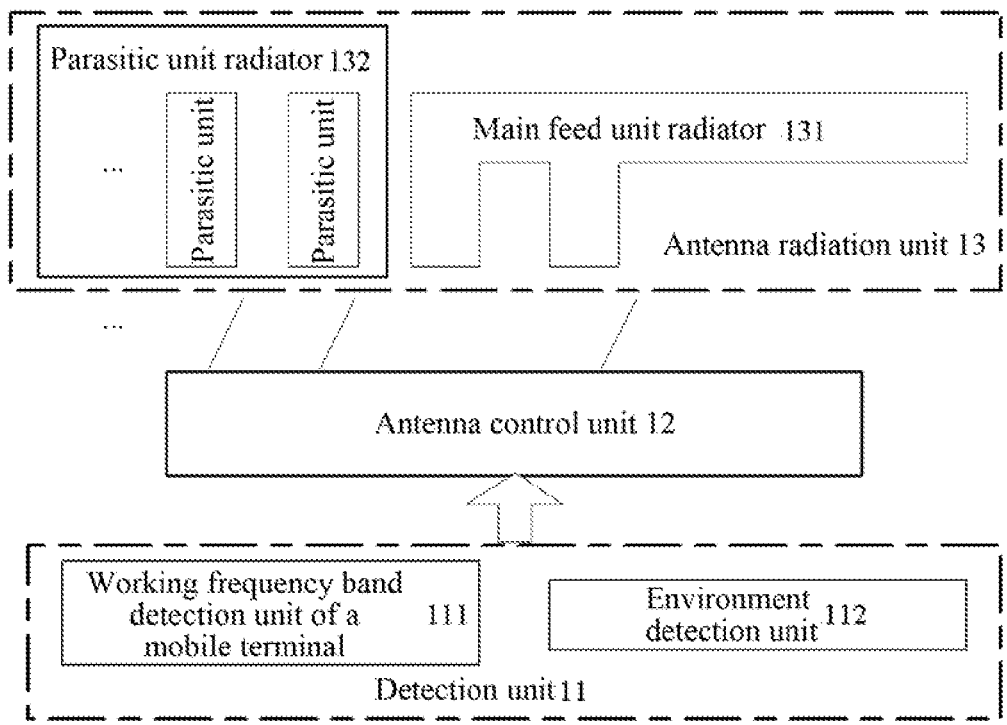
FIG. 2 is a diagram of another constitution for intelligently switching on/off an antenna according to embodiment one of the present invention.

Alternatively, in another embodiment, the detection unit 11 may further be configured to detect current surrounding environment of the mobile terminal, and transmit a detection result to the antenna control unit 12. As shown in FIG. 2, the detection unit 11 not only includes a working frequency band detection unit 111 configured to detect a working frequency band of the terminal, but also includes an environment detection unit 112 configured to detect the current surrounding environment of the terminal. At this time, the antenna control unit 12 is further configured to change the impedance characteristics of the parasitic unit radiator 132 according to a preset correspondence between the antenna radiation unit 13 and the environment condition, or preset correspondence among the antenna radiation unit 13, the environmental condition, and the current working frequency band.

By adding detection of the current surrounding environment and process of the antenna control unit 12, when the mobile terminal is influenced by a human body, the antenna performance when the human body approaches can be improved without increasing a loss in a RF main path, thereby enhancing the antenna performance and ensuring voice quality and the application of data services.

The detection unit 11 detecting a current surrounding environment of the mobile terminal comprises one or more of the following detection: detecting whether the mobile terminal works in a free space; detecting whether there is a human body (people's head and/or people's hand etc.) approaching the mobile terminal; detecting whether the mobile terminal is indoors; and detecting whether the mobile terminal is outdoors. Switching on or off a certain parasitic unit or multiple parasitic units will respectively correspond to a certain human body approach state.

Embodiment Two

Figure 3:
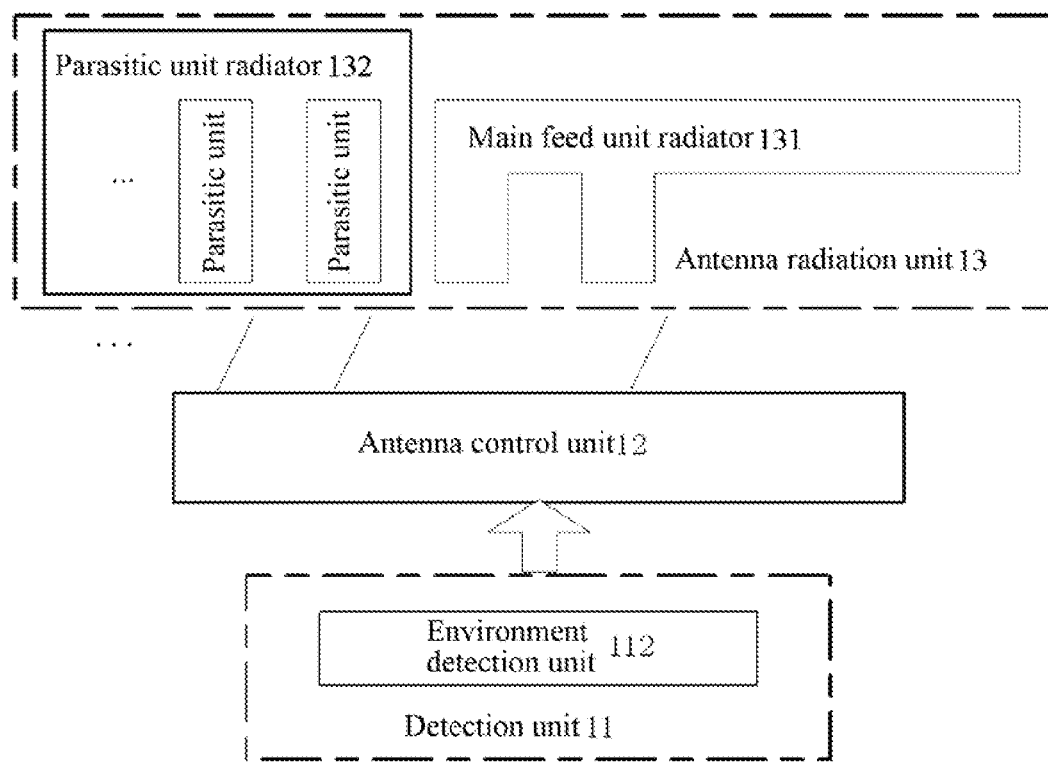
FIG. 3 is a diagram of a constitution for intelligently switching on/off an antenna according to embodiment two of the present invention.

The present embodiment provides a terminal which can improve antenna performance when a human body approaches. As shown in FIG. 3, the terminal includes a detection unit 11, an antenna control unit 12, and an antenna radiation unit 13 which includes a main feed unit radiator 131 and a parasitic unit radiator 132 including one or more parasitic units, wherein, the detection unit 11 is configured to detect a current working frequency band of the mobile terminal and transmit a detection result to the antenna control unit 12;

the antenna control unit 12 is configured to receive the detection result transmitted by the detection unit 11 and change impedance characteristics of the parasitic unit radiator 132 according to a preset correspondence between the antenna radiation unit 13 and the current working frequency band; and the parasitic unit radiator 132 is configured to change the impedance characteristics under the control of the antenna control unit 12.

Alternatively, switching on and/or off of parasitic units in the parasitic unit radiator may be controlled by the antenna control unit 12 transmitting an instruction to the parasitic unit radiator 132 in the antenna radiation unit 13. The parasitic unit radiator 132 switches on one or more parasitic units in the parasitic unit radiator 132 and/or switches off one or more parasitic units in the parasitic unit radiator 132 according to the instruction transmitted by the antenna control unit 12.

Figure 4:
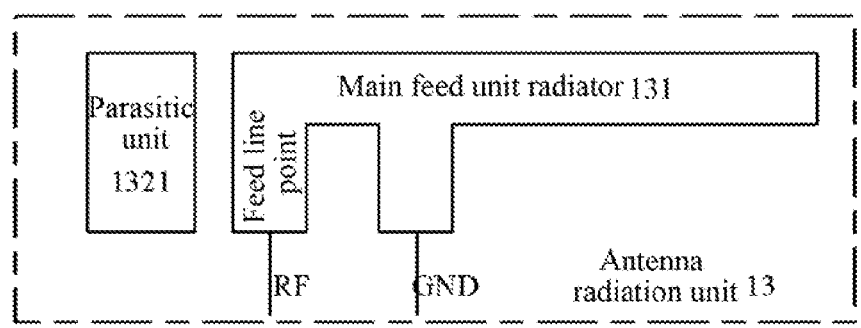
FIG. 4 is a diagram of an antenna radiation unit in a free space state according to embodiment two of the present invention.

When the detection unit 11 detects that the current surrounding environment of the mobile terminal is a free space, a form of the antenna radiation unit 13 is as shown in FIG. 4. The antenna radiation unit 13 is comprised of a main feed unit radiator 131 and a parasitic unit 1321 which is not grounded.

Figure 5:
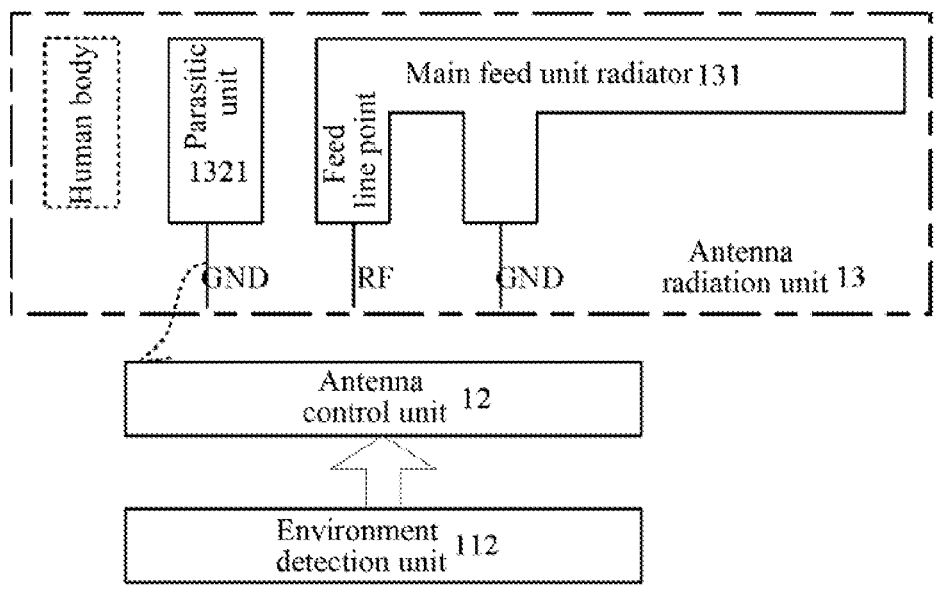
FIG. 5 is a diagram for intelligently switching on/off an antenna in a human body approach state according to embodiment two of the present invention.

The environment detection unit 112 of the mobile terminal may be implemented by sensors, for example, including two proximity sensors configured to detect whether the mobile terminal approaches a human body and transmit a detection result to the antenna control unit 12. When the detection unit 11 detects there is a human body surrounding the mobile terminal, the antenna control unit 12 switches on parasitic units (for example, parasitic unit 1321) according to a preset correspondence, and connect it to the ground in the Printed Circuit Board (PCB) of the mobile phone or a housing of a mobile phone, as shown in FIG. 5. After the antenna control unit 12 switches on the parasitic unit 1321, the antenna radiation unit 13 is commonly comprised of a human body, a main feed unit radiator 131 and a parasitic unit 1321 which is grounded, to form a new form of wiring of the antenna. With the change of the parasitic unit 1321 being grounded, the influence of the human body when the human body approaches the mobile terminal is reduced, and the resonant points of the antenna are readjusted to a preset optimal state. Thereby, this enhances antenna efficiency in a human body approach state, and improves quality of communication of an air interface of the mobile terminal in the process of practical user applications.

Figure 6:
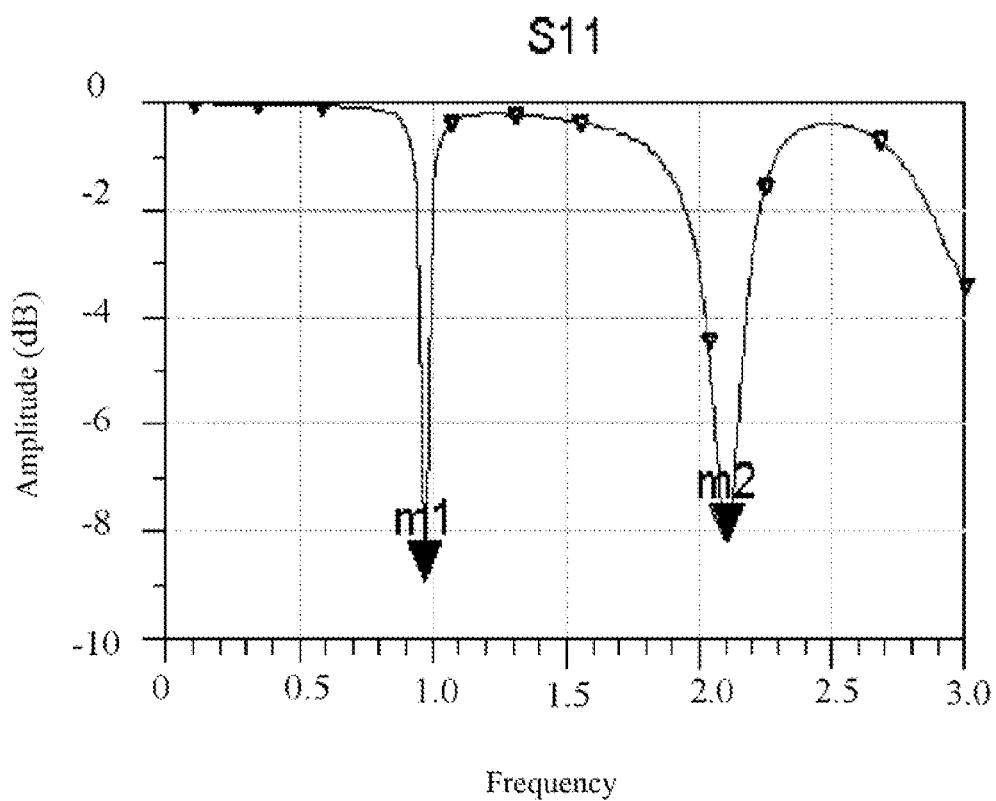
FIG. 6 is a simulation diagram of antenna performance in a free space state.

FIG. 6 is a simulation diagram of antenna performance when a terminal is in a free space state. The antenna works at two resonant points, i.e., 968 MHz and 2.107 GHz. Wherein, S11 is an index quantity characterizing antenna characteristics, and both m1 and m2 are mark points identifying antenna resonance in the process of facsimile. This figure indicates an original state of the antenna, and the deeper the resonant point is, the wider the concave is, which indicates that the better the resonant state of the antenna is, and the wider the bandwidth is.

Figure 7:
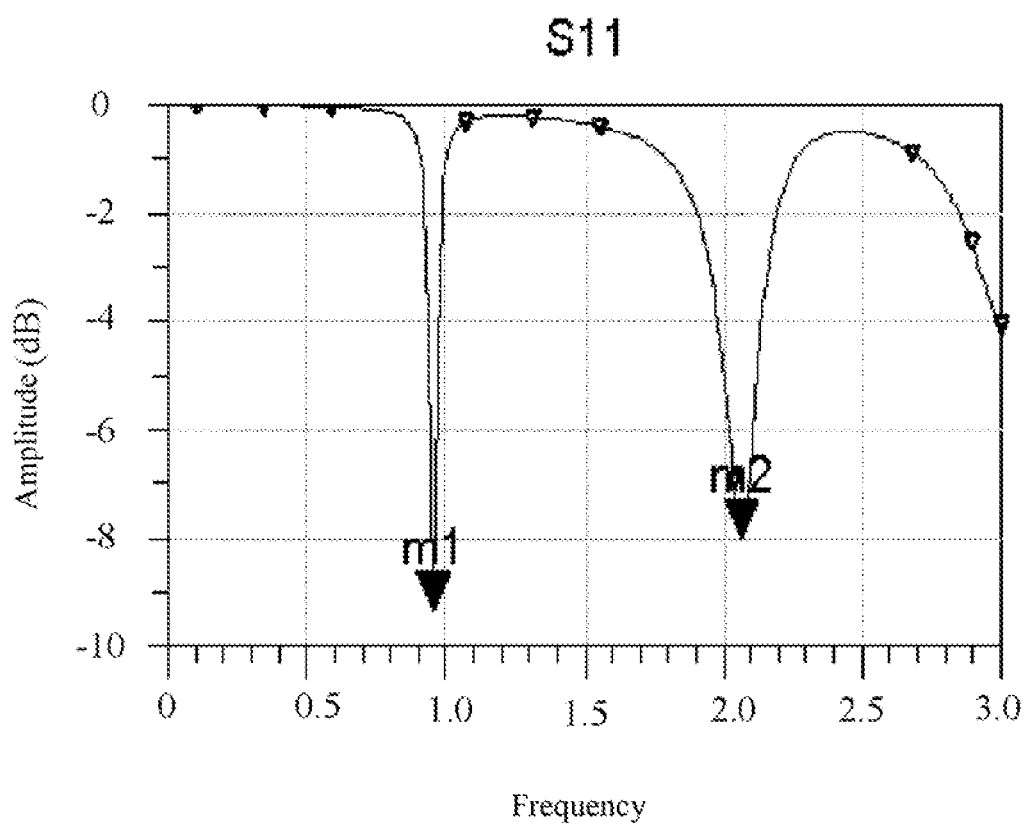
FIG. 7 is a simulation diagram of antenna performance in a human body approach state.

FIG. 7 is a simulation diagram of antenna performance in a human body approach state. Due to the influence of the intervention of the human body, two resonant points of the antenna in a free space state are shifted to low frequencies, i.e., 953.4 MHz and 2.064 GHz. The meanings of various parameters in the figure are the same as those in FIG. 6. This figure indicates that the resonant points of the antennas are shifted from those in the original free space state due to the intervention of the human body (people's head or people's hand etc.) of a user on the antenna of a mobile phone, thereby resulting in degradation of the antenna performance.

Figure 8:
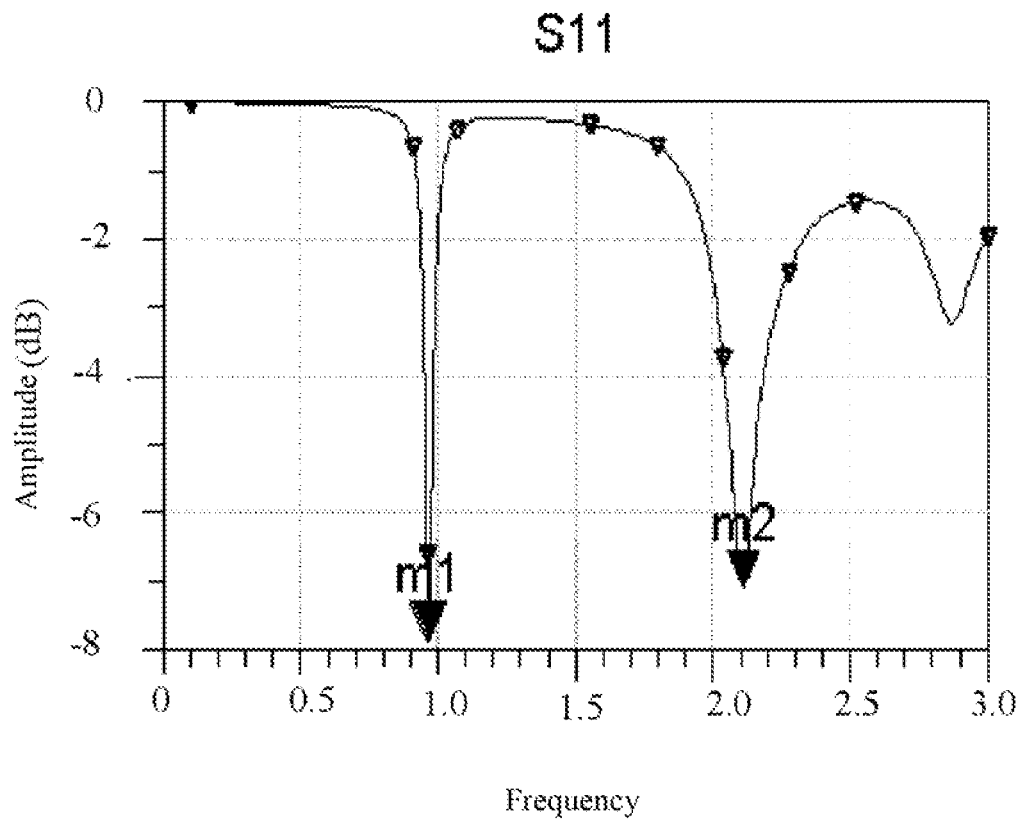
FIG. 8 is a simulation diagram of antenna performance in a human body approach state after an antenna is intelligently switched on/off.

FIG. 8 is a simulation diagram of antenna performance in a human body approach state under the control of an antenna control unit. Under the control of the antenna control unit 12, the human body as well as the main feedback unit radiator 131 and the parasitic unit radiator 132 are commonly used as the antenna radiation unit 13. The meanings of various parameters in FIG. 8 are the same as those in FIG. 6. The figure indicates that in a free space state in FIG. 6, due to the intervention of the human body (such as people's head or people's hand) (FIG. 7), the influence of the human body on the antenna can be minimized with the method proposed in the embodiments of the present invention, i.e., the antenna performance is basically the same as that of the antenna in an original state. That is, a resonant point of the antenna is pulled back to approach 968 MHz and 2.107 GHz in the original state, thereby enhancing the antenna performance under the intervention of the human body.

Embodiment Three

Figure 9:
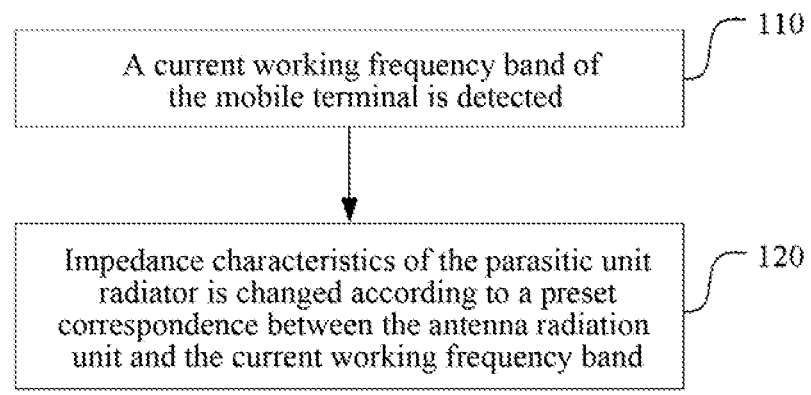
FIG. 9 is a flowchart of embodiment three of the present invention.

The present embodiment describes a method for intelligently switching on/off an antenna of a mobile terminal by the intelligent antenna structure illustrated in FIG. 1. As shown in FIG. 9, the method includes the following steps.

in step 110, a current working frequency band of the mobile terminal is detected; and in step 120, impedance characteristics of the parasitic unit radiator 132 is changed according to a preset correspondence between the antenna radiation unit 13 and the current working frequency band. For example, one or more parasitic units in the parasitic unit radiator 132 are switched on, and/or one or more parasitic units in the parasitic unit radiator 132 are switched off.

Embodiment Four

Figure 10:
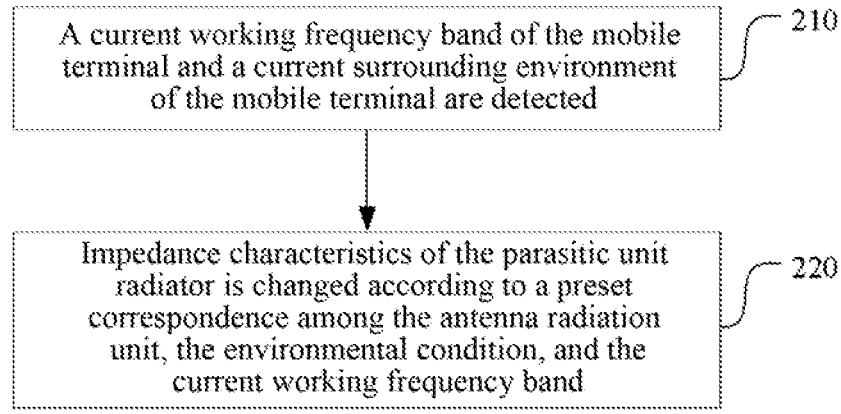
FIG. 10 is a flowchart of embodiment four of the present invention.

The present embodiment describes a method for intelligently switching on/off an antenna of a mobile terminal by the intelligent antenna structure illustrated in FIG. 2. As shown in FIG. 10, the method includes the following steps.

In step 210, a current working frequency band of the mobile terminal and a current surrounding environment of the mobile terminal are detected; and in step 220, impedance characteristics of the parasitic unit radiator 132 is changed according to a preset correspondence among the antenna radiation unit 13, the environmental condition, and the current working frequency band.

Embodiment Five

Figure 11:
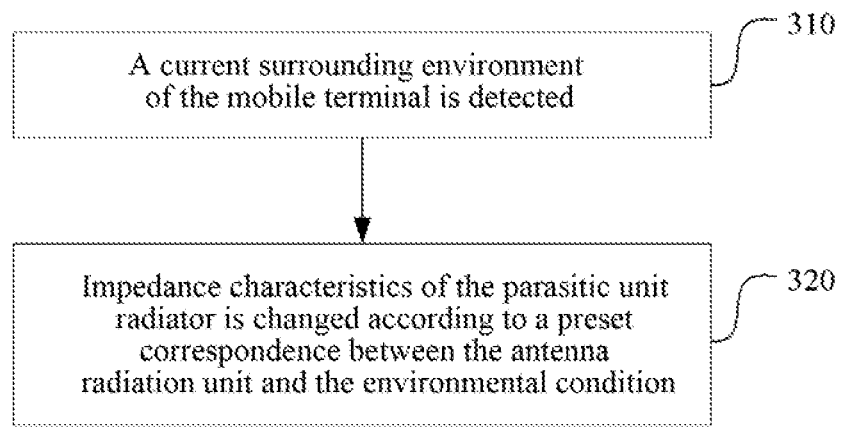
FIG. 11 is a flowchart of embodiment five of the present invention.

The present embodiment describes a method for intelligently switching on/off an antenna of a mobile terminal by the intelligent antenna structure illustrated in FIG. 3. As shown in FIG. 11, the method includes the following steps.

In step 310, a current surrounding environment of the mobile terminal is detected; and in step 320, impedance characteristics of the parasitic unit radiator 132 is changed according to a preset correspondence between the antenna radiation unit 13 and the environmental condition.

A person having ordinary skill in the art can understand that all or a part of steps in the above method can be implemented by programs instructing related hardware, and the programs can be stored in a computer readable storage medium, such as a read-only memory, disk or disc etc. Alternatively, all or a part of steps in the above embodiments can also be implemented by one or more integrated circuits. Accordingly, each module/unit in the above embodiments can be implemented in a form of hardware, or can also be implemented in a form of software functional module. The present document is not limited to any particular form of a combination of hardware and software.

Of course, the present document can have a plurality of other embodiments. Without departing from the spirit and substance of the present document, those skilled in the art can make various corresponding changes and variations according to the present document, and all these corresponding changes and variations should belong to the protection scope of the appended claims in the present document.

INDUSTRIAL APPLICABILITY

In the above technical schemes, on one hand, the antenna performance in the current working frequency band of the mobile terminal can be optimized according to the current frequency band, to solve the design problem that there are higher requirements of the antenna of the multi-standard multimode mobile terminal on the frequency bandwidth. On the other hand, when the mobile terminal is influenced by a human body, the antenna performance when the human body approaches is improved without increasing a loss in a RF main path, thereby enhancing the antenna performance and ensuring voice quality and the application of data services. Therefore, the present document has strong industrial applicability.

What is claimed is:

1. A mobile terminal intelligently switching on/off an antenna, comprising a detection unit, an antenna control unit, and an antenna radiation unit which comprises a main feed unit radiator and a parasitic unit radiator, wherein, the detection unit is configured to detect a current working frequency band of the mobile terminal and transmit a detection result to the antenna control unit;

the antenna control unit is configured to receive the detection result transmitted by the detection unit and change an impedance characteristic of the parasitic unit radiator according to a preset correspondence between the antenna radiation unit and the current working frequency band; and the parasitic unit radiator is configured to change the impedance characteristic in accordance with the control of the antenna control unit;

wherein, the antenna control unit is configured to change the impedance characteristic of the parasitic unit radiator according to the following way: transmitting an instruction to the parasitic unit radiator in the antenna radiation unit to switch on one or more parasitic units in the parasitic unit radiator and/or switch off one or more parasitic units in the parasitic unit radiator; and the parasitic unit radiator is configured to change the impedance characteristic in accordance with the control of the antenna control unit according to the following way: switching on one or more parasitic units in the parasitic unit radiator according to the instruction transmitted by the antenna control unit;

wherein the parasitic units are neither grounded nor connected to the main feed unit radiator before being switched on, and are grounded but still not connected to the main feed unit radiator after being switched on.

2. The mobile terminal according to claim 1, wherein, the detection unit is further configured to detect a current surrounding environment of the mobile terminal and transmit a detection result to the antenna control unit; and the antenna control unit is further configured to change an impedance characteristic of the parasitic unit radiator according to a preset correspondence between the antenna radiation unit and the environment condition, or a preset correspondence among the antenna radiation unit, the environmental condition, and the current working frequency band.

3. The mobile terminal according to claim 2, wherein, the detection unit is configured to detect the current surrounding environment of the mobile terminal according to one or more of the following ways:

detecting whether the mobile terminal works in a free space;

detecting whether there is a human body approaching the mobile terminal;

detecting whether the mobile terminal is indoors; and detecting whether the mobile terminal is outdoors.

4. A mobile terminal intelligently switching on/off an antenna, comprising a detection unit, an antenna control unit, and an antenna radiation unit which comprises a main feed unit radiator and a parasitic unit radiator, wherein, the detection unit is configured to detect a current surrounding environment of the mobile terminal and transmit a detection result to the antenna control unit;

the antenna control unit is configured to receive the detection result transmitted by the detection unit and change an impedance characteristic of the parasitic unit radiator according to a preset correspondence between the antenna radiation unit and the environment condition; and the parasitic unit radiator is configured to change the impedance characteristic in accordance with the control of the antenna control unit;

wherein the antenna control unit is configured to change the impedance characteristic of the parasitic unit radiator according to the following way: transmitting an instruction to the parasitic unit radiator in the antenna radiation unit to switch on one or more parasitic units in the parasitic unit radiator and/or switch off one or more parasitic units in the parasitic unit radiator; and the parasitic unit radiator is configured to change the impedance characteristic in accordance with the control of the antenna control unit according to the following way: switching on one or more parasitic units in the parasitic unit radiator according to the instruction transmitted by the antenna control unit;

wherein the parasitic units are neither grounded nor connected to the main feed unit radiator before being switched on, and are grounded but still not connected to the main feed unit radiator after being switched on.

5. The mobile terminal according to claim 4, wherein, the detection unit is configured to detect the current surrounding environment of the mobile terminal according to one or more of the following ways:

detecting whether the mobile terminal works in a free space;

detecting whether there is a human body approaching the mobile terminal;

detecting whether the mobile terminal is indoors; and
detecting whether the mobile terminal is outdoors.

6. A method for intelligently switching on/off an antenna of a mobile terminal, an antenna radiation unit of the mobile terminal comprising a main feed unit radiator and a parasitic unit radiator, the method comprising:

detecting a current working frequency band by the mobile terminal; and the mobile terminal changing an impedance characteristic of the parasitic unit radiator according to a preset correspondence between the antenna radiation unit and the current working frequency band;

wherein, the step of changing the impedance characteristic of the parasitic unit radiator comprises:

switching on one or more parasitic units which are neither grounded nor connected to the main feed unit radiator before being switched on in the parasitic unit radiator to make parasitic units switched on grounded but still not connected to the main feed unit radiator.

7. A method for intelligently switching on/off an antenna of a mobile terminal, an antenna radiation unit of the mobile terminal comprising a main feed unit radiator and a parasitic unit radiator, the method comprising:

detecting a current surrounding environment by the mobile terminal; and the mobile terminal changing an impedance characteristic of the parasitic unit radiator according to a preset correspondence between the antenna radiation unit and the environment condition;

wherein, the step of changing the impedance characteristic of the parasitic unit radiator comprises: switching on one or more parasitic units which are neither grounded nor connected to the main feed unit radiator before being switched on in the parasitic unit radiator to make parasitic units switched on grounded but still not connected to the main feed unit radiator.

8. The method according to claim 7, wherein, the step of detecting a current surrounding environment of the mobile terminal comprises one or more of the following detections:

detecting whether the mobile terminal works in a free space;

detecting whether there is a human body approaching the mobile terminal;

detecting whether the mobile terminal is indoors; and detecting whether the mobile terminal is outdoors.

9. A method for intelligently switching on/off an antenna of a mobile terminal, an antenna radiation unit of the mobile terminal comprising a main feed unit radiator and a parasitic unit radiator, the method comprising:

detecting a current working frequency band and a current surrounding environment by the mobile terminal; and the mobile terminal changing an impedance characteristic of the parasitic unit radiator according to a preset correspondence among the antenna radiation unit, the environmental condition, and the current working frequency band;

wherein, the step of changing the impedance characteristic of the parasitic unit radiator comprises:

switching on one or more parasitic units which are neither grounded nor connected to the main feed unit radiator before being switched on in the parasitic unit radiator to make parasitic units switched on grounded but still not connected to the main feed unit radiator.

10. The method according to claim 9, wherein, the step of detecting a current surrounding environment of the mobile terminal comprises one or more of the following detections:

detecting whether the mobile terminal works in a free space;

detecting whether there is a human body approaching the mobile terminal;

detecting whether the mobile terminal is indoors; and detecting whether the mobile terminal is outdoors.

* * * * *